July 12, 1927.

H. W. GOODALL 1,635,783

HOSE CLAMP

Filed April 8, 1926

WITNESS:

INVENTOR

Howard W. Goodall
BY
Augustus B. Stoughton
ATTORNEY.

Patented July 12, 1927.

1,635,783

UNITED STATES PATENT OFFICE.

HOWARD W. GOODALL, OF ALDAN, PENNSYLVANIA.

HOSE CLAMP.

Application filed April 8, 1926. Serial No. 100,528.

Objects of the present invention are to provide a comparatively inexpensive, efficient and reliable hose clamp; to avoid injury to the hose in the application of the clamp; to provide a clamp of such construction that a wide range of sizes using the same castings can be provided; and to provide a clamp that can be transported, applied and removed without disconnection of any of its parts.

Figure 1:
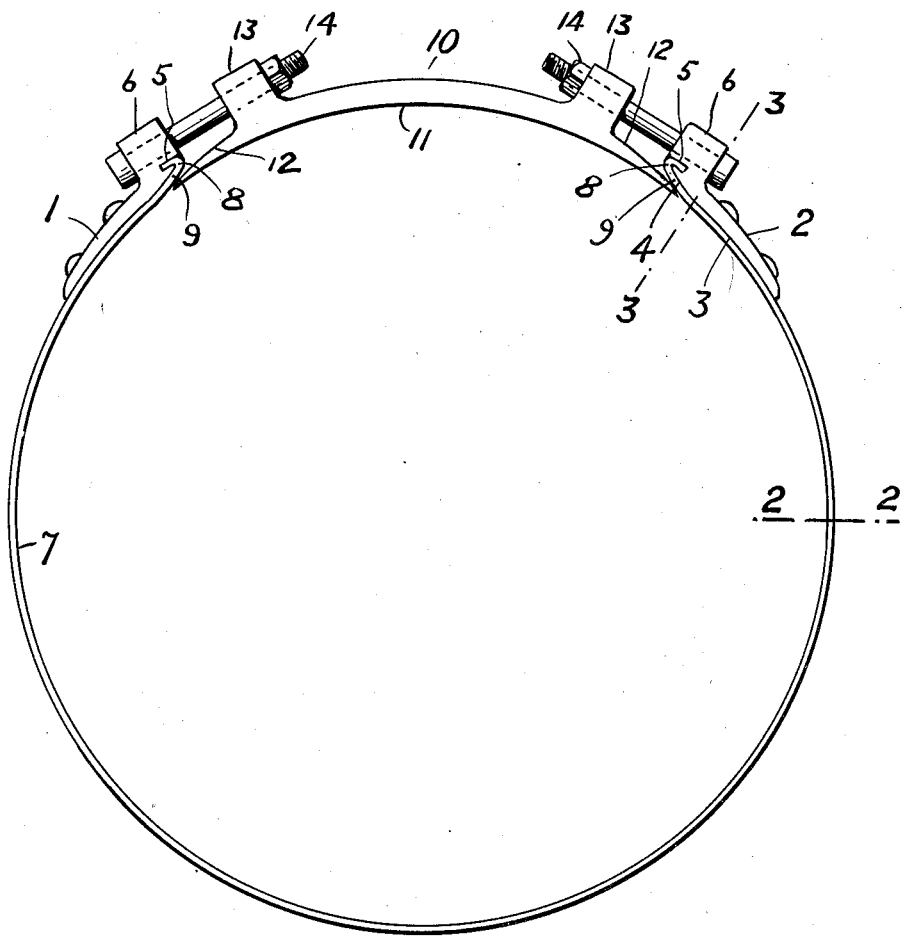

Other objects of the invention will appear from the following description at the end of which the invention will be claimed and in the description reference will be made to the accompanying drawing forming part hereof and in which Figure 1 is an elevational view of a circular hose clamp embodying features of the invention.

Figure 2:
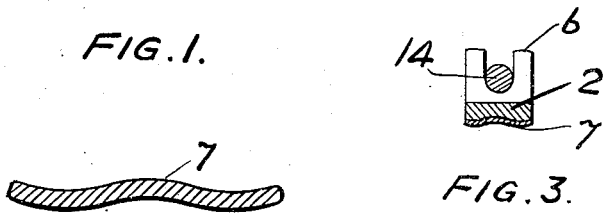
Figure 3:
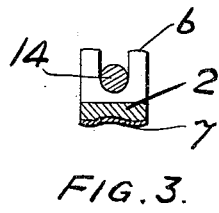

Fig. 2 is a sectional view taken on the line 2—2 of Fig. 1 and drawn to an enlarged scale, and Fig. 3 is a section on the line 3—3 of Fig. 1.

In the drawing 1 and 2 are terminals and they are duplicate castings so that a description of one will suffice, although their bolt receiving provisions may well be different as will be described. The terminal has diverging arcuate and inclined inner faces 3 and 4, and it is provided with an end notch 5. A lug or ear 6 is also shown as a provision of the terminal. 7 is a ring section, preferably of bendable or wrought metal, and it has end hooks 8 engaging the notches 5. The end sections 9 of the ring section conform to the inclined inner faces 4 of the terminal. The ring 7 may well be corrugated or shaped as shown in Fig. 2, so that it may be embedded in the hose to provide a firm hold without cutting or injuring the hose. 10 is a cast saddle having an arcuate inner face 11 and having on the outside of its ends beveled faces 12. The saddle 10 is shown as provided with lugs or ears 13. 14 are bolts and nuts engaging the ears 6 and 13. The opening in one of the lugs or ears may well be a slot 15, while the other openings are holes, so that the clamp can be taken off and applied without detachment of any of its parts which might result in their loss.

The hose clamp is of circular form and it may be provided in various sizes with the use of the same castings by the employment of ring sections 7 of appropriate lengths. The beveled outer faces 12 of the saddle underlap the end portions 9 of the ring section which conform to the inner inclined faces 4 of the terminals. It may be assumed that when the hose clamp is applied to the hose it is of circular form, and as it is clamped by drawing up the bolts and nuts 14, the saddle 10 may be regarded as moving inward toward the center of the circle of the clamp when applied, and the beveled outer faces 12 of the saddle ride on the end portions 4 of the ring section which are outwardly inclined.

It will be obvious to those skilled in the art to which the invention relates that modifications may be made in details of construction and arrangement and in matters of mere form without departing from the spirit of the invention which is not limited to such matters or otherwise than the prior art and the appended claims may require.

I claim:

1. A circular hose clamp including terminals having divergent arcuate and inclined inner faces and end notches, a ring section having end hooks engaging said notches and having its end portions conforming to said inclined faces, a saddle having an arcuate inner face and beveled outer faces underlapping the end portions of the ring section which conform to the inclined faces of the terminals, and means for drawing the terminals and the saddle together.

2. A circular hose clamp including terminals having end notches, a ring section having outturned end hooks engaging said notches, a saddle underlapping the end portions of the ring section, and means interposed between the saddle and each terminal for drawing each of the terminals and the saddle together.

3. A circular hose clamp including terminals, a ring section detachably attached to the terminals, a saddle, and means for drawing the terminals and saddle together.

HOWARD W. GOODALL.